United States Patent
Allen

(10) Patent No.: US 7,827,301 B2
(45) Date of Patent: *Nov. 2, 2010

(54) METHOD FOR CONNECTION ACCEPTANCE CONTROL AND OPTIMAL MULTI-MEDIA CONTENT DELIVERY OVER NETWORKS

(75) Inventor: Arthur Allen, Mountain View, CA (US)

(73) Assignee: Democrasoft, Inc., Santa Rosa, CA (US)

( * ) Notice: Subject to any disclaimer, the term of this patent is extended or adjusted under 35 U.S.C. 154(b) by 1091 days.

This patent is subject to a terminal disclaimer.

(21) Appl. No.: 11/445,579

(22) Filed: Jun. 2, 2006

(65) Prior Publication Data

US 2006/0224666 A1 Oct. 5, 2006

Related U.S. Application Data

(63) Continuation of application No. 09/344,688, filed on Jun. 25, 1999, now Pat. No. 7,334,044.

(60) Provisional application No. 60/108,777, filed on Nov. 17, 1998.

(51) Int. Cl.
G06F 15/16 (2006.01)

(52) U.S. Cl. .......... 709/233; 709/232; 709/231; 709/230; 709/223; 709/224; 709/219; 709/229; 370/229; 370/232; 370/233; 370/236; 370/237; 370/468; 370/477

(58) Field of Classification Search .......... None
See application file for complete search history.

(56) References Cited

U.S. PATENT DOCUMENTS

| | | | | |
|---|---|---|---|---|
| 5,463,620 | A | * | 10/1995 | Sriram .................. 370/412 |
| 5,502,816 | A | * | 3/1996 | Gawlick et al. ........... 709/227 |
| 5,583,995 | A | | 12/1996 | Gardner et al. |
| 5,982,748 | A | * | 11/1999 | Yin et al. ............... 370/232 |
| 5,995,488 | A | | 11/1999 | Kalkunte et al. |
| 6,006,264 | A | | 12/1999 | Colby et al. |
| 6,047,328 | A | | 4/2000 | Charny et al. |
| 6,052,384 | A | * | 4/2000 | Huang et al. ............ 370/468 |
| 6,069,894 | A | | 5/2000 | Holender et al. |

(Continued)

OTHER PUBLICATIONS

Lakshmanan et al., "Placement Strategies for Internet-Scale Data Stream Systems," IEEE CS Press, Nov./Dec. 2008, pp. 50-60.

(Continued)

*Primary Examiner*—Syed A. Zia
(74) *Attorney, Agent, or Firm*—Carr & Ferrell LLP

(57) ABSTRACT

A method for bandwidth allocation for delivery of multimedia data from at least one server to one or more clients over a network. The method includes the steps of: determining a maximum flow rate and a minimum flow rate for each client; determining a flow rate range for each client as given by the difference between the maximum flow rate and the minimum flow rate; sorting the one or more clients according to the flow rate range; initializing a current flow rate for each client as the minimum flow rate and summing the flow rate into total server flow rate; establishing remaining server bandwidth; and allocating the remaining server bandwidth to clients, based upon the sorted client's flow rate ranges.

16 Claims, 11 Drawing Sheets

U.S. PATENT DOCUMENTS

| | | | |
|---|---|---|---|
| 6,125,396 | A | 9/2000 | Lowe |
| 6,192,029 | B1 | 2/2001 | Averbuch et al. |
| 6,212,169 | B1 | 4/2001 | Bawa et al. |
| 6,240,066 | B1 * | 5/2001 | Nagarajan et al. ........... 370/230 |
| 6,240,103 | B1 * | 5/2001 | Schoenblum et al. ....... 370/468 |
| 6,295,294 | B1 | 9/2001 | Odlyzko |
| 6,304,551 | B1 * | 10/2001 | Ramamurthy et al. ....... 370/232 |
| 6,331,986 | B1 * | 12/2001 | Mitra et al. ................. 370/468 |
| 6,400,686 | B1 | 6/2002 | Ghanwani et al. |
| 6,466,979 | B1 * | 10/2002 | Plouffe, Jr. .................. 709/226 |
| 6,477,167 | B1 * | 11/2002 | Wu ....................... 370/395.21 |
| 6,493,317 | B1 | 12/2002 | Ma |
| 6,570,883 | B1 | 5/2003 | Wong |
| 6,597,662 | B1 | 7/2003 | Kumar et al. |
| 6,647,008 | B1 | 11/2003 | Galand et al. |
| 6,647,419 | B1 | 11/2003 | Mogul |
| 6,850,965 | B2 * | 2/2005 | Allen ......................... 709/203 |
| 7,027,403 | B2 * | 4/2006 | Porikli et al. ............... 370/238 |
| 2001/0003830 | A1 | 6/2001 | Nielsen |
| 2002/0176369 | A1 * | 11/2002 | Porikli et al. ............... 370/252 |
| 2003/0016664 | A1 | 1/2003 | MeLampy et al. |
| 2003/0072327 | A1 | 4/2003 | Fodor et al. |
| 2006/0101104 | A1 * | 5/2006 | Bhanot et al. ............... 708/105 |
| 2007/0160007 | A1 * | 7/2007 | Wang et al. ................. 370/331 |

OTHER PUBLICATIONS

Kim, S. et al., Call Admission Control for Prioritized Adaptive Multimedia Services in Wireless/Mobil Networks, *VTC 2000-Spring. 2000 IEEE 51st. Vehicular Technology Conference Proceedings.* Tokyo, Japan, May 15-18, 2000, *IEEE Vehicular Technology Conference*, New York, NY., (May 15, 2000) IEEE, US, vol. 2 of 3: Conf. 51, pp. 1536-1540.

Reininger, D. et al., "A Dynamic Quality of Service Framework for Video in Broadband Networks", *IEEE Network, IEEE Inc.*, New York, US (Nov. 6, 1998), 12:6, pp. 22-34.

Beard, C. et al. "Connection Admission Control for Differentiating Priority Traffic on Public Networks", *Military Communications Conference Proceedings*, 1999, *Milcom* 1999. IEEE Atlantic City, NJ, USA Oct. 31-Nov. 3, 1999, Piscataway, NJ, USA, IEEE, US (Oct. 31, 1999) pp. 1401-1408.

Bronstein, Semendjajew, "Taschenbuch der Mathematik" (1989) *Harri Deutsch*, Frankfurt, Germany, pp. 695-698.

* cited by examiner

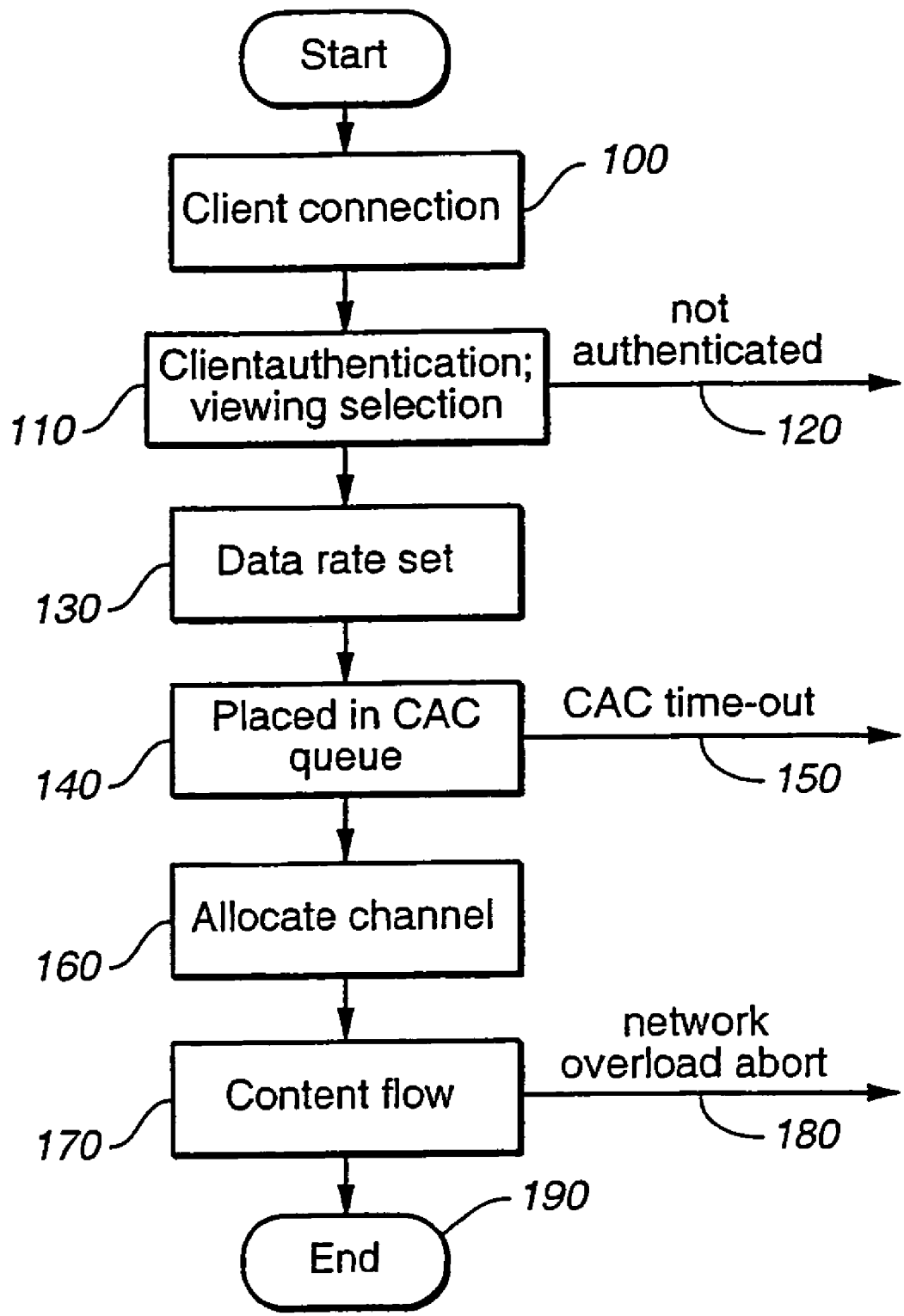
FIG._1

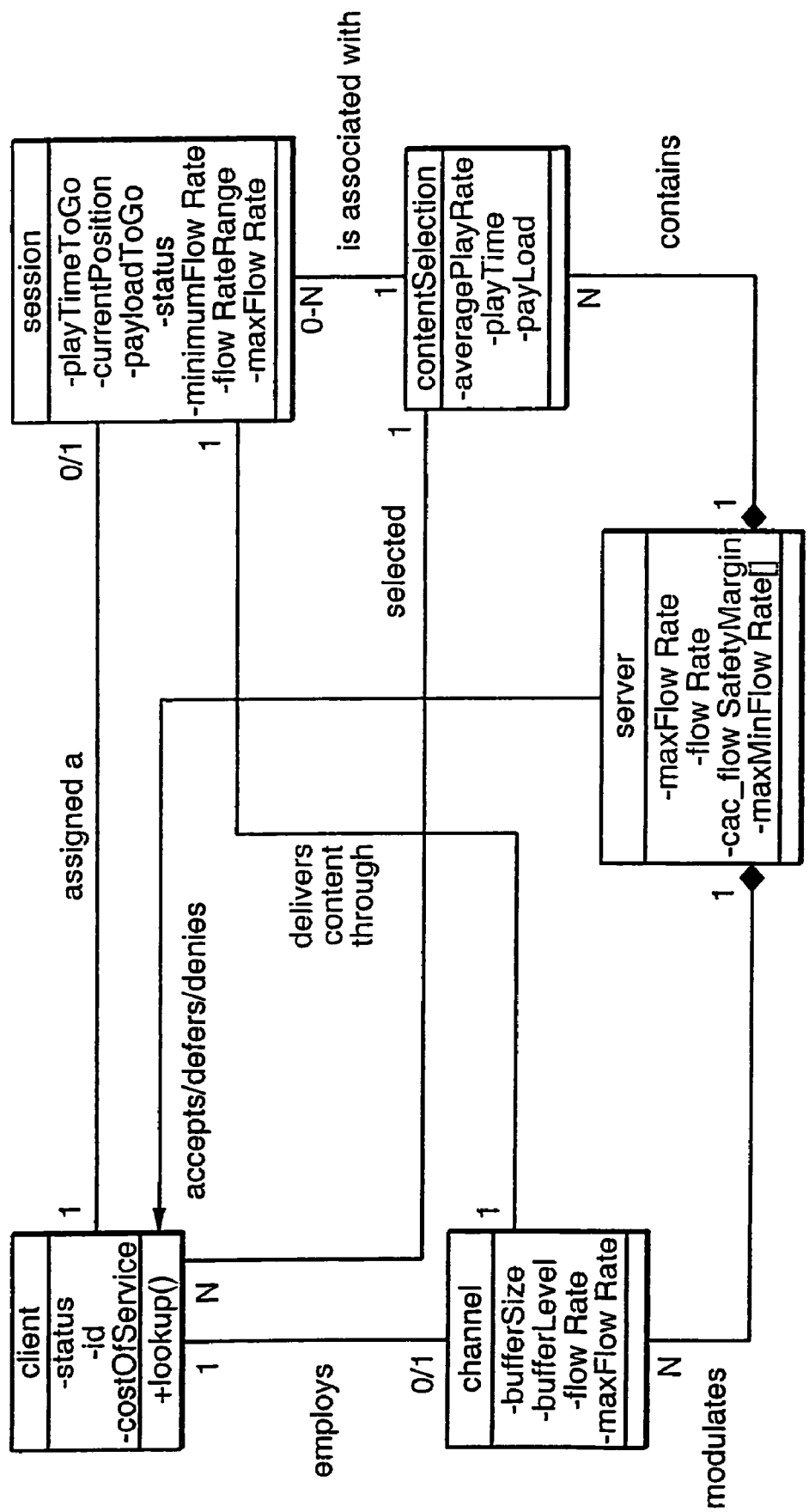
FIG._2

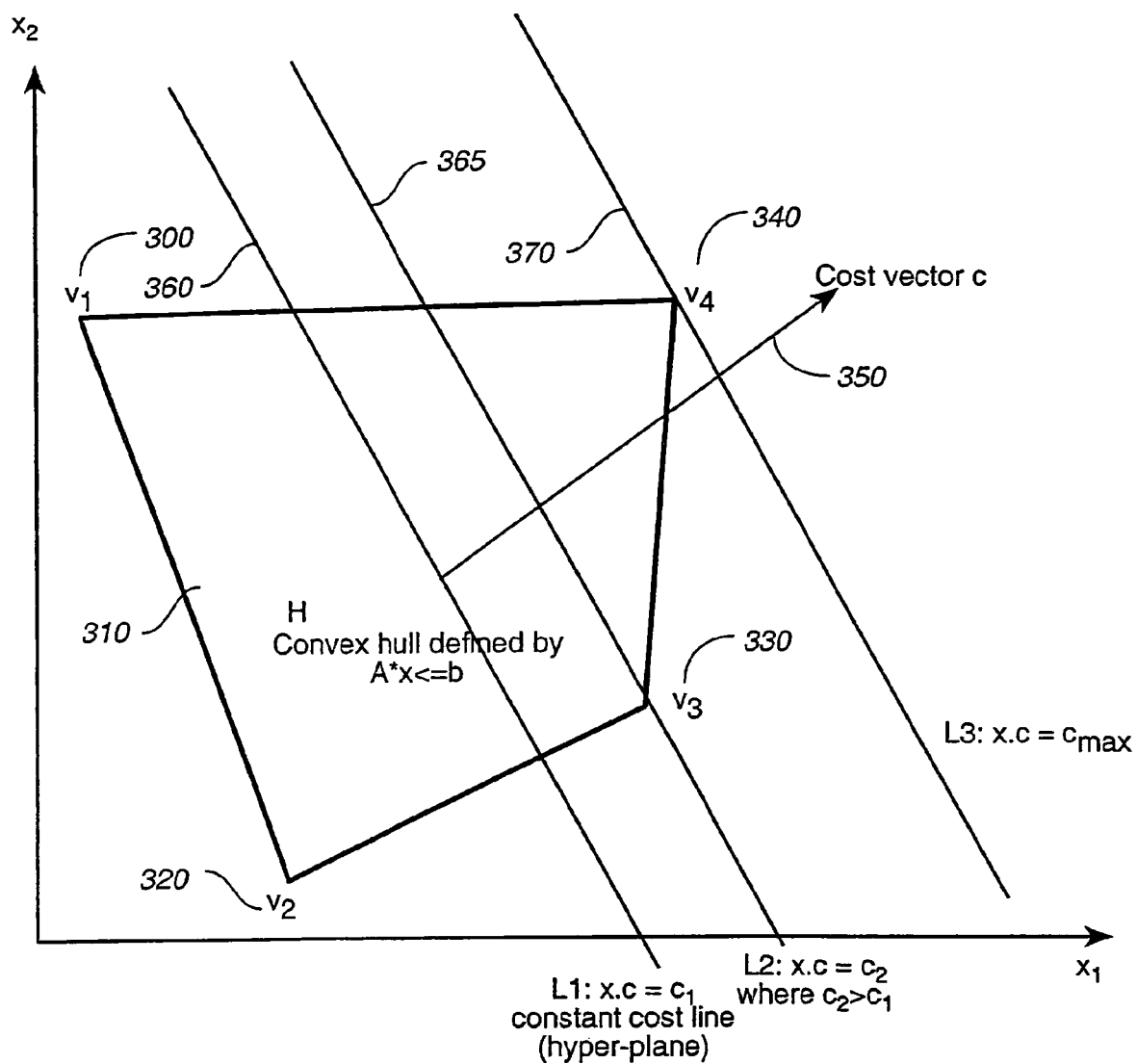
FIG._3

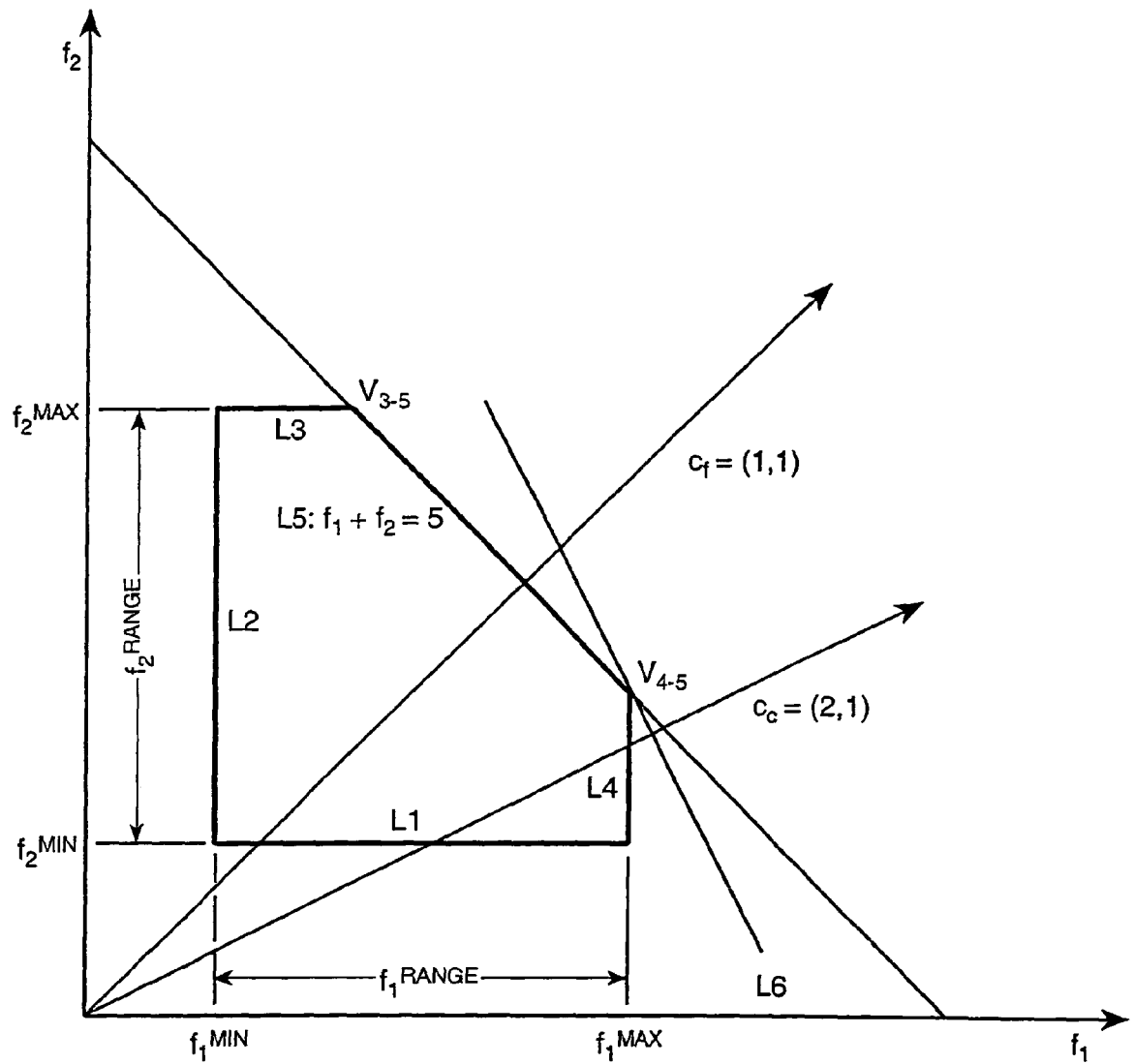
FIG._4a

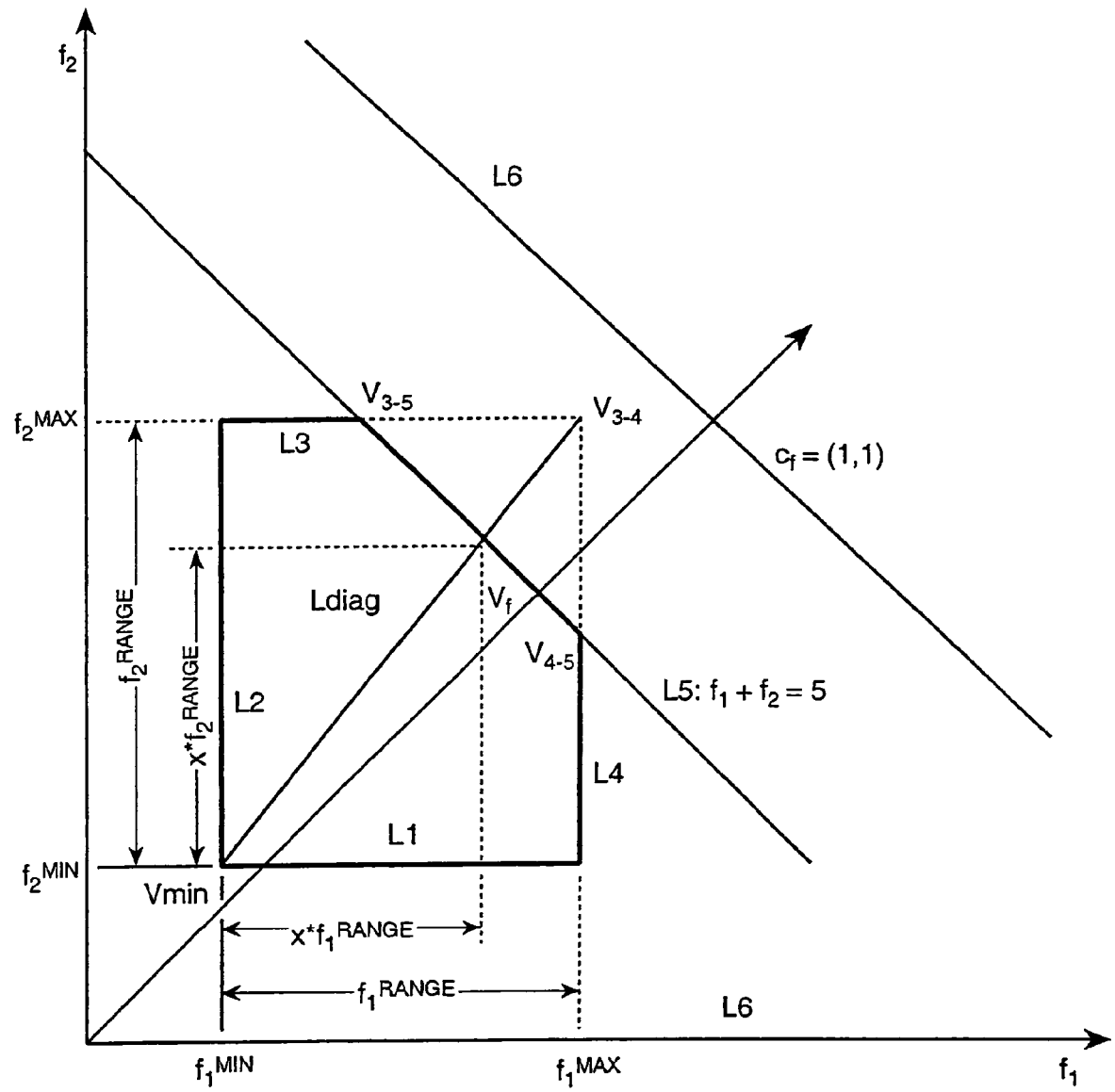
FIG._4b

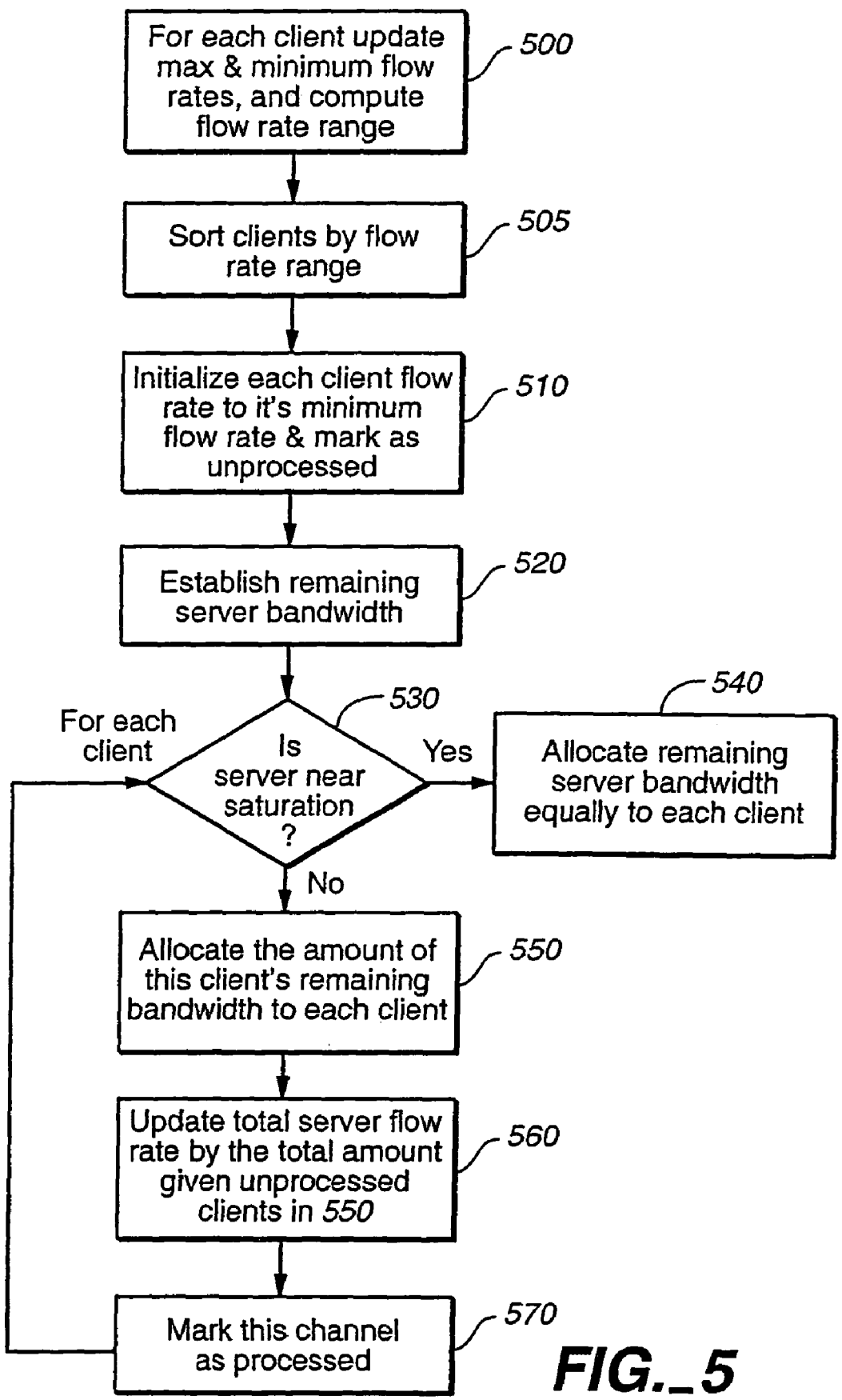
FIG._5

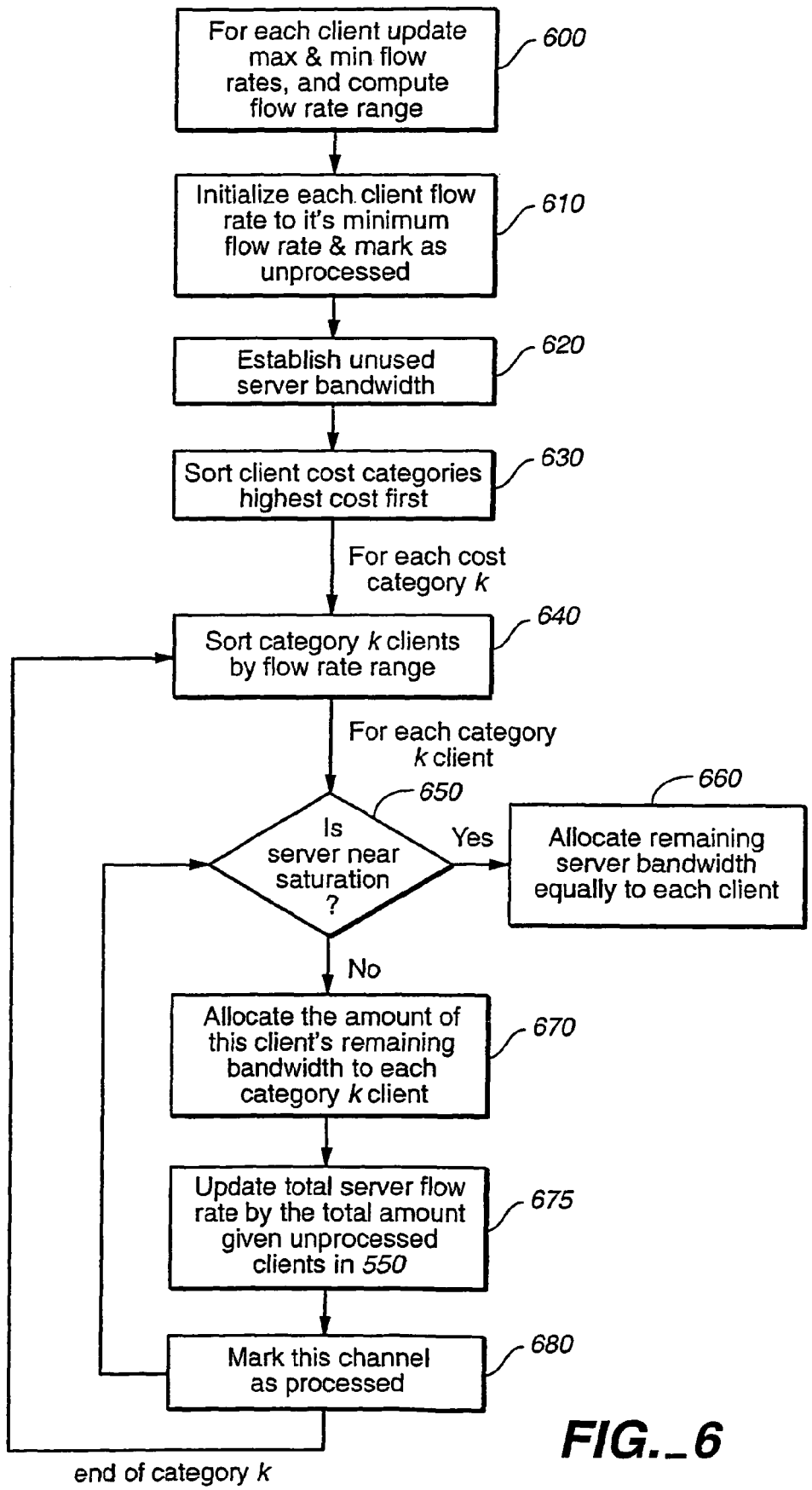
FIG._6

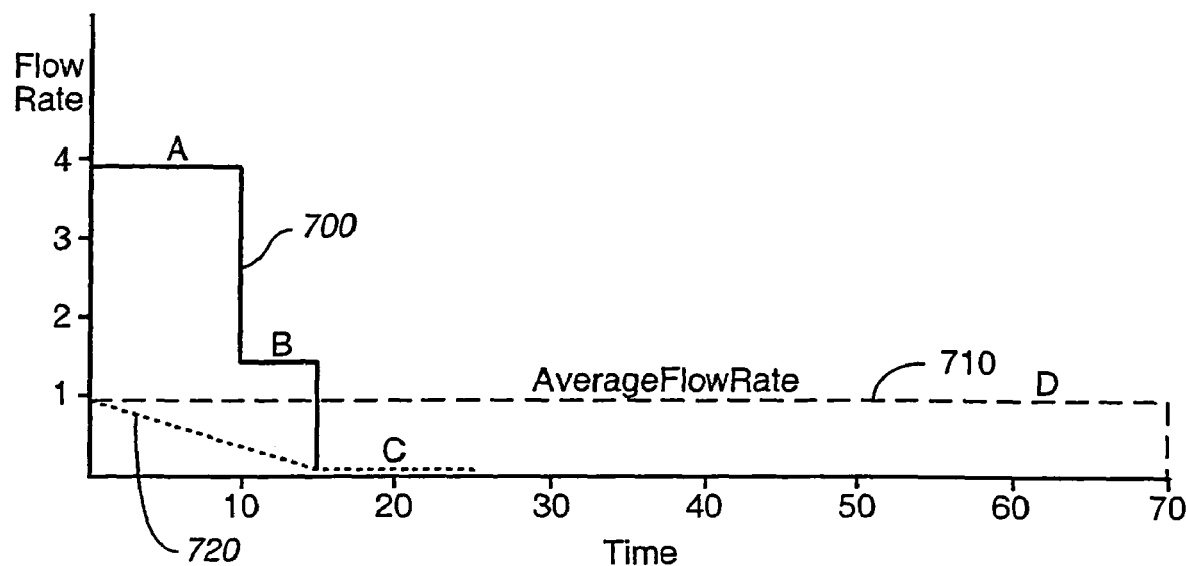
FIG._7
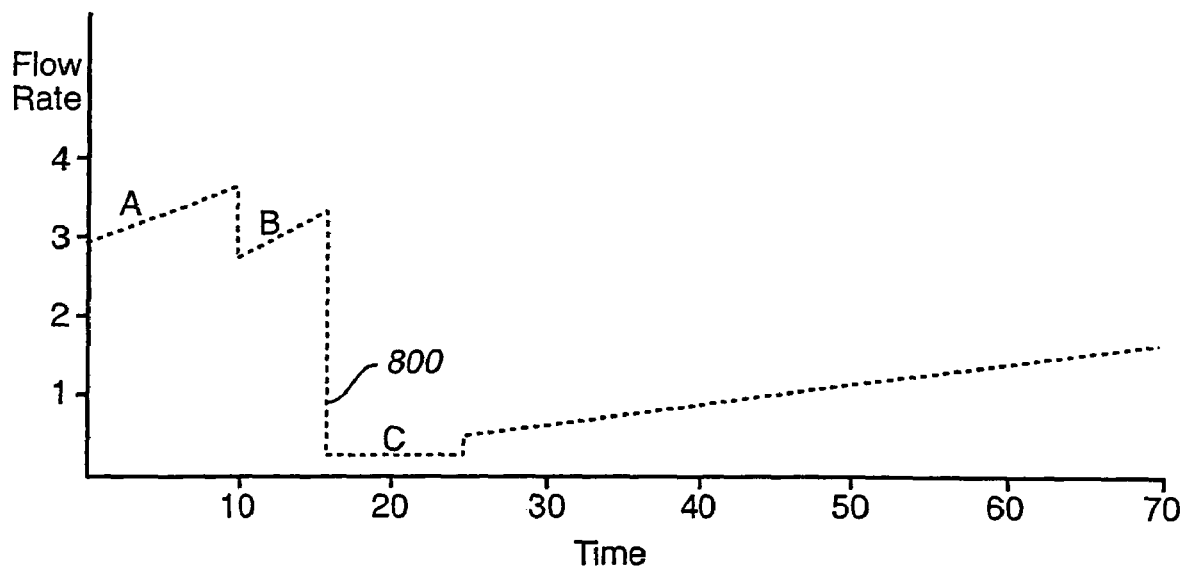
FIG._8

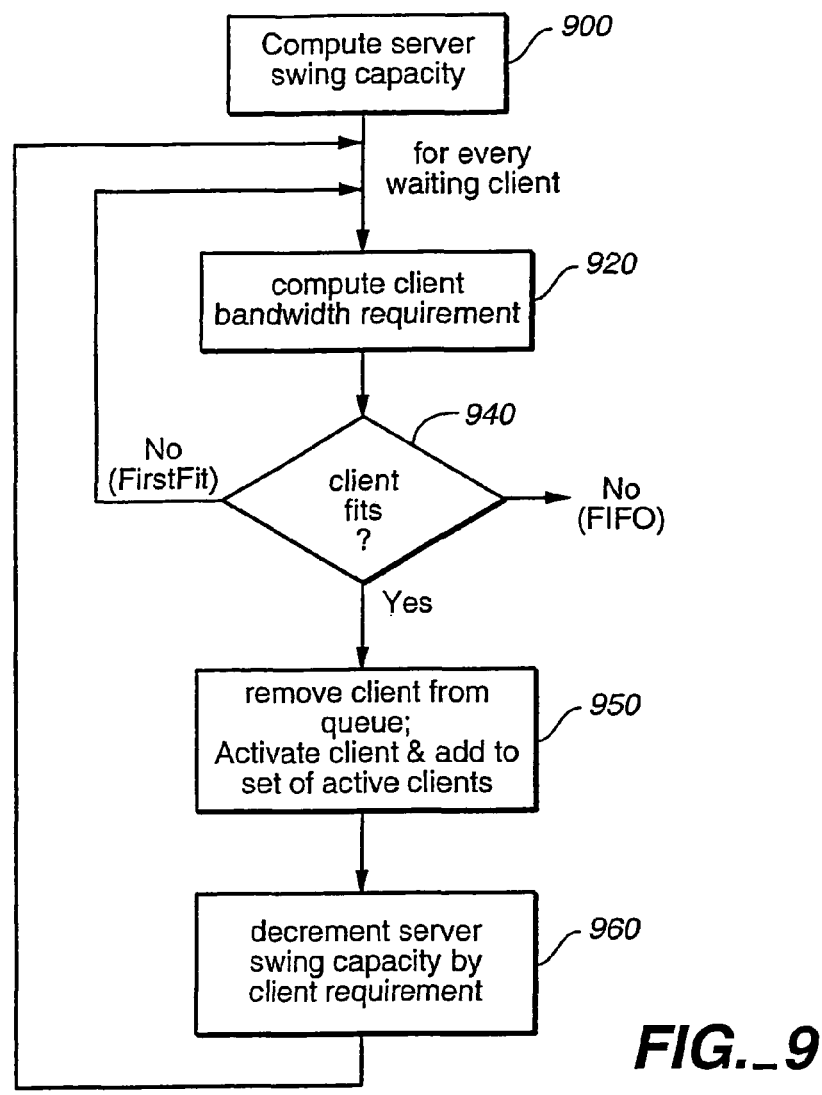
FIG._9
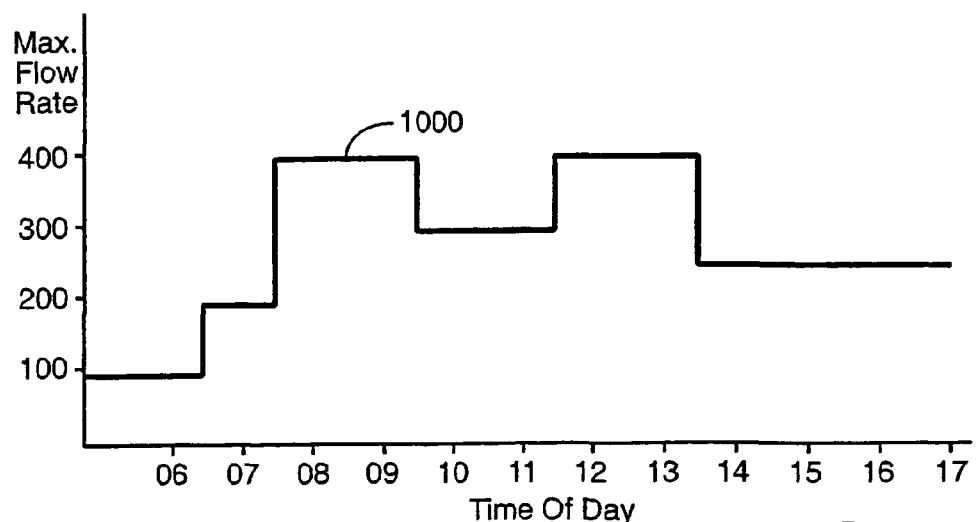
FIG._10

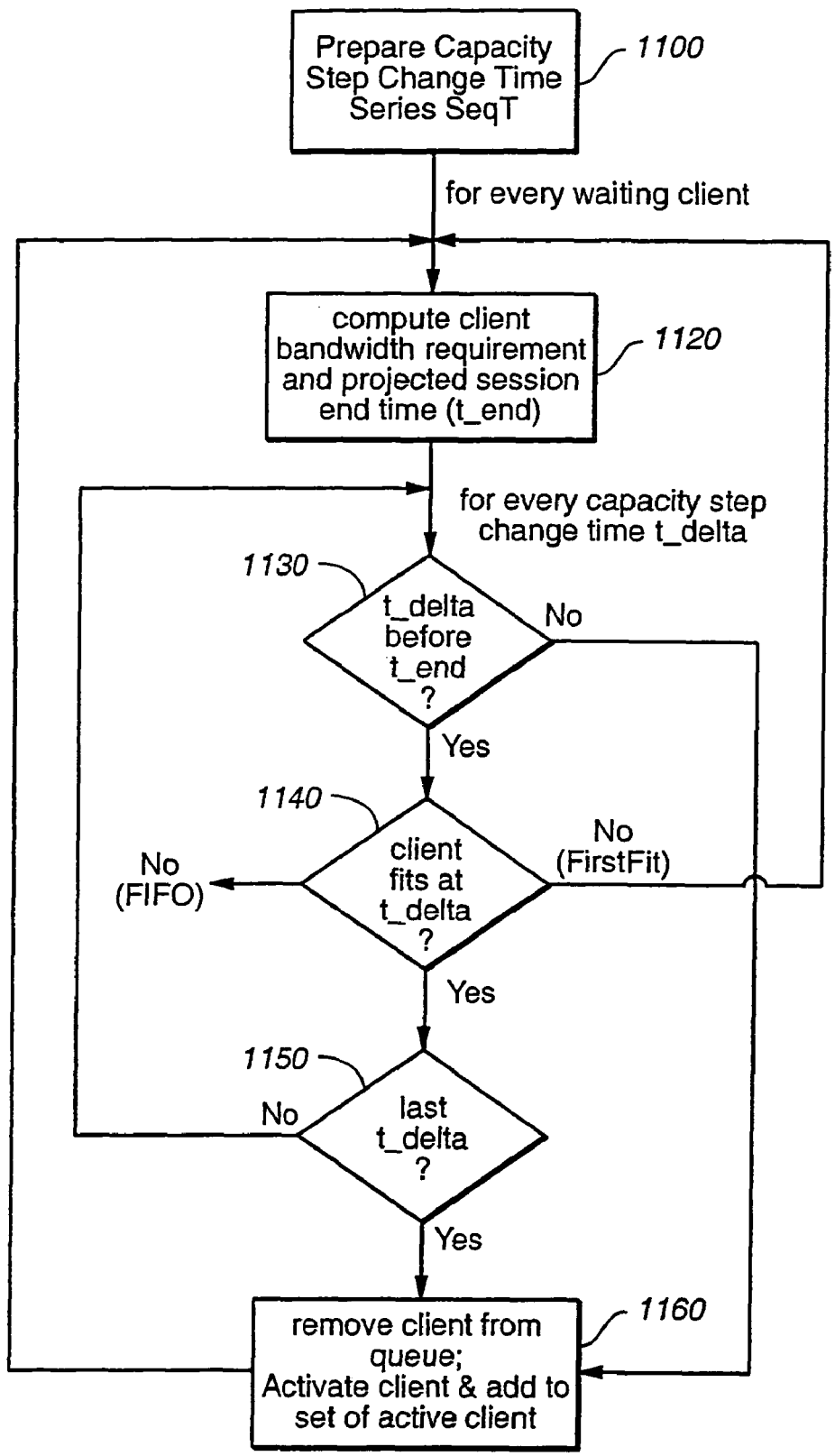
FIG._11

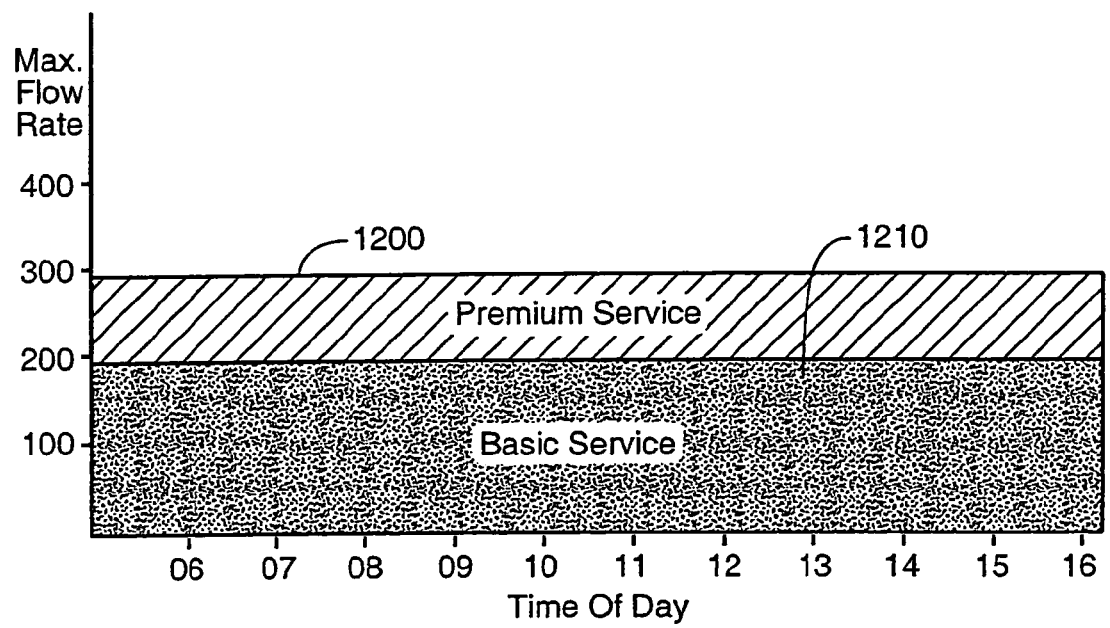
FIG._12
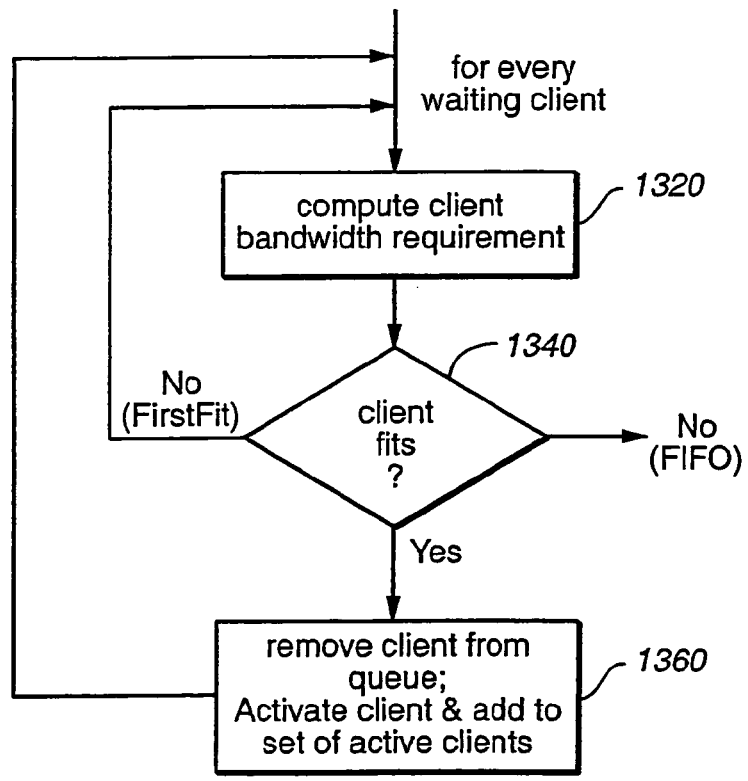
FIG._13

METHOD FOR CONNECTION ACCEPTANCE CONTROL AND OPTIMAL MULTI-MEDIA CONTENT DELIVERY OVER NETWORKS

CROSS-REFERENCE TO RELATED APPLICATIONS

This application is a Continuation of U.S. patent application Ser. No. 09/344,688, filed Jun. 25, 1999, which claims priority to provisional application No. 60/108,777, filed Nov. 17, 1998, both of which are incorporated herein by reference.

BACKGROUND OF THE INVENTION

1. Field of the Invention

The invention relates to the field of delivery of multimedia content over a variety of networks. More specifically, it pertains to multimedia servers which service many clients simultaneously for the delivery of multimedia content which is used and played back at each client. It addresses methods for determining optimal delivery rates to each client and methods for determining whether new clients may be accepted without diminishing the quality of service to existing clients.

2. Description of Related Art

In the history of multimedia program delivery, some in the industry have long advocated the use of large client-side buffers and faster-than-real-time content delivery over a network as offering the best of all worlds: a jitter-free viewing experience and a cost-effective utilization of the network resources at hand. Few systems, however, go very far in addressing how to schedule clients or a method for accepting new clients. Real-time systems, often known as streaming systems, can schedule new clients in a very simple manner—if sufficient bandwidth remains for the added real-time stream, then the client may be accepted. However, such systems do not maximize the number of simultaneous clients. On the other hand, faster than real-time delivery, sometimes known as store-and-forward systems, open up the possibility for more flexible scheduling procedures to control and optimize the number of simultaneous clients while ensuring a high level of quality of service.

The methods for such call acceptance and flow modulation that have been proposed in the prior art have been largely ad-hoc and also incomplete. These have been ad-hoc in the sense that there has been no guiding rationale for their selection from among many possible and potentially superior alternatives. The methods have also been incomplete insofar as they did not address the question of whether any given incoming request for service should be accepted or denied. Video-on-demand systems, or more generally, any system in which a multimedia server is designed to serve multiple clients over a network to deliver bounded content, can benefit from the use of such flow modulation techniques and call acceptance procedures.

BRIEF SUMMARY OF THE INVENTION

Optimal Content Flow Modulation

The present invention addresses multimedia content delivery optimization by re-casting the problem to be solved as an optimization problem in which one seeks to maximize a designated value function moment-by-moment, subject to a set of real-world operational constraints which will typically vary over time. Accordingly, given a set of clients and associated sessions, an optimal delivery procedure continuously establishes content flow rates from the content server to each of its clients so as to maximize aggregate value according to the governing value function.

This approach holds several advantages: 1) optimization problems are well understood, and are tractable by a large and diverse collection of computational methods; 2) if it exists, the global solution that is obtained is arguably optimal by construction, and thus superior or equal to all other.

The present invention teaches the method of optimizing two particular value functions:

1) total data delivered (maximize throughput).
2) total delivery charges (maximize charges).

The first value function does not distinguish one customer from another and will deliver as much data as possible from server to clients irrespective of the characteristics of the latter. The second value function favors the service of high paying customers. It can easily be seen that the first function is a special case of the second one whereby all clients are charged equally.

As will be seen in this disclosure, optimizing for these functions and identifying the necessary constraints requires a new and unique perspective that is specifically designed for the multimedia environment. Moreover, the disclosed methods are specifically designed to account for and accommodate real-world scenarios of today's networks. Consequently several variations of the method are presented to accommodate various scenarios.

The following briefly-defined concepts are useful in understanding the present invention:

Call/Connection Acceptance Control (CAC)

In accordance with the invention, a CAC procedure is responsible for deciding whether a candidate for service can be accommodated without jeopardizing sessions already in progress at the present time or at some time in the future; failing that, it must decide whether a service request should be queued for a time, or rejected.

Flow Modulation

Flow modulation methods are those portions of the system which manage the communication and data flow between the server and the clients. Collectively, these methods provide the multimedia data to the client and provide the server with the information about the state of the transmission, playback, user status and network status. These parameters are further used by the present invention in the CAC procedures. In fact, as will be shown, the proposed CAC procedures are tightly integrated with the flow modulation methods.

Adaptation to Variations in Network Capacity

Operational constraints may change overtime. For instance, one might elect to vary the total bandwidth available for multimedia content delivery according to the time of day. Alternatively, exogenous data flows on the network may cause unexpected disturbances by usurping available bandwidth and impeding the delivery of data along established session channels. The content delivery strategy of the present invention includes the ability to adapt to scheduled as well as unexpected disturbances so as to minimize unwanted disruptions of services.

Burst Transmissions Provide the Opportunity to Adapt

The present invention, due to it's faster-than-realtime transmissions (also know as burst transmissions), which are realized by use of high-bandwidth networks and large client cache or intermediate storage, provides an opportunity to adapt to changing network conditions. In contrast, real-time (streaming) systems of the prior art are essentially designed for worst-case scenarios: each client must be assumed to constantly use the complete real-time playback bandwidth. Such prior art systems are unable to adapt to any derivation from this scenario. For example, take the simple case where the total server bandwidth is 100% utilized by all clients playing back the streaming video. Should any network condition change, such as a temporary decrease in available bandwidth over the network, then one or more clients' playback is interrupted, and the system can not recover from such a condition until the bandwidth is regained. Even worse, if a single client presses pause either that unused bandwidth must remain reserved and no more clients can be accepted, or that paused client is pushed out in order to service the new client. In essence little or no CAC procedure may be implemented.

In contrast, the present invention burst transmits portions of a program and immediately 'gets ahead of itself', thus allowing headroom for a myriad of methods to intelligently handle new clients, client interactivity and possible network fluctuations.

In accordance with the invention, methods are disclosed for optimally determining the flow rate to each client. Methods are also disclosed for accepting or rejecting new clients; these call-acceptance methods are tightly coupled with said flow rate modulation methods. A series of constraint expressions are presented which govern the methods for determining the flow rates and acceptance of new clients. Linear programming techniques are used to optimally solve these expressions. Various embodiments are presented including scenarios for multiple-rate tariffs, and time-of-day bandwidth variations.

BRIEF DESCRIPTION OF THE DRAWINGS

FIG. 1 depicts the flow of control and/or data between the different stations of a content delivery session;

FIG. 2 illustrates the Entity Data Model;

FIG. 3 geometrically illustrates the problem statements;

FIG. 4 geometrically illustrates an expansion of the problem statement;

FIG. 5 illustrates a method for implementing flow modulation;

FIG. 6 illustrates a method for implementing flow modulation for maximized charges;

FIG. 7 illustrates typical content flow;

FIG. 8 illustrates typical server swing capacity;

FIG. 9 illustrates a method for call-acceptance and control (CAC);

FIG. 10 illustrates planned constraints on maximum flow;

FIG. 11 illustrates a method for call-acceptance and control (CAC) with scheduled flow changes;

FIG. 12 illustrates stratification of services; and

FIG. 13 illustrates a method for call-acceptance and control (CAC) for maximal charge.

DETAILED DESCRIPTION OF THE INVENTION

FIG. 1 depicts the flow of control and/or data between the different stations of a content delivery session in accordance with the invention. As shown, a client attempts a connection (100) and manifests itself to the Content Selection subsystem by means of a low bandwidth control channel (not shown). Next the client is authenticated and a selection is made (110), typically with the aid of a browser software such as Netscape™ or Microsoft Internet Explorer™. If the client is not authenticated, it is dismissed from the system (120). If the client has been authenticated and a program selected for viewing then the rate of service is set at this point (130), perhaps according to the selection that was made, or some contractual stipulation. The client is now placed on the service queue of the CAC subsystem (140). A client that is made to wait too long will eventually balk (150). Assuming this does not occur, the CAC subsystem will eventually allocate a channel to the client and open a session (160). Control now devolves upon the Content Flow Modulator (not shown) which starts the flow of content from server to client (170). Subsequent capacity changes, whether predictable or not, may force in abrupt termination of a session in progress (180). Otherwise the session runs to completion (190).

The entities entering into our discussion are depicted in FIG. 2. Client 200 maintains certain data associated with this entity; as shown but not labeled, which includes without limitation, status, id and costOfService. The other entities also each include unlabeled but depicted data. The diagram farther depicts the relationship between each entity. As shown, client 200 is assigned a session 240. Client 200 employs a channel 210. Client 200 selects contentSelection 230. Session 240 delivers content through channel 210. Server 220 modulates channel 210. Server 200 contains contentSelection 210. Server 220 accepts, defers or denies client 200. And contentSelection 230 is associated with session 240.

Furthermore FIG. 2 depicts the various one-to-many relationships. Each client 200 employs one channel 210. Client 200 may or may not receive one of channel 210, as depicted by the 0/1 notation. Similarly, client 200 may or may not receive a session 240. However, whenever client 200 does receive a session 240, it will always receive a channel 210 since channel 210 and session 240 are allocated as a pair. One or more (N) of client 200 may select one of contentSelection 230. And server 220 contains one or more (N) of contentSelection 230. Each one of contentSelection 230 is associated with 0-N of session 240. Each session 240 delivers content through one of channel 210. And server 220 modulates one or more (N) of channel 210.

A more detailed list of each entity of FIG. 2, and each one's associated description, data elements and function calls is listed below. This listing closely resembles that of object-oriented programming. As such, 'methods' represent the ability to obtain or modify data, while 'attributes' represent data which is directly associated with that particular entity. The listing also includes information relating to one embodiment wherein software programming specifics are disclosed, such as a variable type (double, int and so forth) and more. The present invention is not limited to such an embodiment and other implementations are possible without deviating from the scope and intent of the present invention. The listing, however detailed, is merely illustrative of the data and functions which are used in the equations and methods described herein.

Consequently, data and functions from this listing, associated with the various entities, will be used in forthcoming equations, flowcharts and methods. The reader is directed to this listing as reference when reading such equations and examining such drawings.

—Start of Entity Data Model Detailed Listing—

Model: Untitled 1 (Public)

Contains:
    client, session, channel, server, contentSelection.

Component: Client (Public Class/Interface)

Comment:
    A client entity stands for a client presently requesting or receiving service.

Methods:
    public static lookup (id: in int): client
    public GetId ( ): const int&
    public SetId (val: in int&)
    public GetCostOfService ( ): const double&
    public SetCostOfService (val : in double&)

Attributes:
    private status: client<int>
    Specifies whether or not a client has been allocated a channel and session.
    private id: int
    Integer-valued identifier that is unique to the client (primary key). Can be obtained from a monotonically increasing counter.
    private costOfService: double
    Dollar charge per Mbyte. This value is the same for all customers under flow optimization. Under cost/charge optimization may be an integer value reflective of the rank; the higher the rank the higher the charge.

Has:
    public selected: contentSelection
    public assigned a: session
    public employs: channel Component: Session (Public Class/Interface)

Comment:
    A session entity holds various state information about the service being received by an associated customer.
    public GetCurrentPosition ( ): const double&
    public SetCurrentPosition (val: in double&)
    public GetPayloadToGo ( ): const double&
    public SetPayloadToGo (val : in double&)
    public GetStatus ( ): const int&
    public SetStatus (val : in int&)
    public GetMinimumFlowRate ( ): const double&
    public SetMinimumFlowRate (val: in double&)
    public GetFlowRateRange ( ): const double&
    public SetFlowRateRange (val : in double&)
    public GetMaxFlowRate ( ): const double&
    public SetMaxFlowRate (val: in double&)

Attributes:
    private playTimeToGo: double
    Indicates the minutes remaining in the viewing experience. Initialized to contentSelectiont.playTime (see below).
    private currentPosition: double
    Pointer into media content from which content is being delivered.
    private payloadToGo: double
    The amount of media content (in Mbytes) as yet undelivered by the server. Does not include any content presently stored in the client-side buffer.
    private status: int
    Indicates whether session is active or paused.
    private minimumFlowRate: double
    This is the minimum flow from server to client required to ensure uninterrupted service over the remaining playTime. Has a value of zero if playloadToGo is zero. Given by (payloadToGo*8)/(playTimeToGo*60)
    private flowRateRange: double
    Specifies the effective range over which the channel content flow serving a session is constrained without consideration for interactions with other flows. Equals maxFlowRate−minimumFlowRate
    private maxFlowRate: double
    Effective maximum bound on flow as expressed in formula (8) which must be re-evaluated periodically.

Has:
    public delivers content through: channel

Component: Channel (Public Class/Interface)

Comment:
    A channel represents the network resources from server to client associated with an ongoing session, encompassing the client-side buffer if any, and its level.
    public GetBufferLevel ( ): const double&
    public SetBufferLevel (val: in double&)
    public GetFlowRate ( ): const double&
    public SetFlowRate (val: in double&)
    public GetMaxFlowRate ( ): const double&
    public SetMaxFlowRate (val : in double&)

Attributes:
    private bufferSize: double
    Capacity of the client-side buffer (or equivalent).
    private bufferLevel: double
    Current buffer level in MBytes of stored content.
    private flowRate: double
    Flow rate through channel specified by the relevant optimizing flow modulator.
    private maxFlowRate: double
    This value represents the maximum possible flow rate from the server to an individual client over its "channel". This value reflects restrictions on flow that pertain to an individual client. It may be determined by factors such as the bandwidth of client's link to the network, or a limit imposed administratively to ensure balanced network utilization.

Component: Server (Public Class/Interface)

Comment:
    Entity representing the media server and its CAC and flow modulation activities.
    public GetFlowRate ( ): const double&
    public SetFlowRate (val: in double&)
    public GetMaxMinFlowRate[ ]( ): const double& public SetMaxMinFlowRate[ ] (val: in double&)

Attributes:
    private maxFlowRate: double
    Maximum possible content flow that is allocated to the server by the network.
    Private FlowRate: Double
    Aggregate content flow rate, summed over all sessions and their associated channels.
    private cac.flowSafetyMargin: double
    Tunable safety margin used by the CAC algorithm to protect sessions-in-progress from being affected by changes in available network bandwidth.
    private maxMinFlowRate[ ]: double
    Applies when N rate tariffs exist. This array holds the maximum floor level for each category of service. The value for the costliest category N is stored in maxMinFlowRate[N−1], and for the least costliest in maxMinFlowRate[0]. It is the relative magnitude of these ascending values that matters, not their absolute value. Thus the actual maximum floor flow rate for category k is given by server.maxFlowRate*(server.maxMinFlowRatc[k−1]/server.maxMinFlowRate[N−1]). Similarly, the maximum floor flow rate for category N is server.maxFlowRate.

Has:
    public contains: contentSelection
    public modulates: channel
Component: contentSelection (Public Class/Interface)
Comment:
    Entity represents a video/sound clip or other bounded unit of content. A continuous data feed does not qualify.
Attributes:
    private averagePlayRate: double
        The average rate at which media content is consumed by the client, as computed by dividing the (payload*8) by the (playTime*60)
    private playTime: double
        Duration of play of the media content in minutes.
    private payLoad: double
        total size of the content in Mbytes.
Has:
    public is associated with: session
—End of Entity Data Model Detailed Listing—

The following table summarizes the highlights of the previous detailed description of each entity in FIG. 2.

| Entity | Description |
|---|---|
| client 200 | Each client is denoted by an associated unique integer index$_{Id}$. The set of active clients is denoted by $S_{activeClients}$. The set of deferred clients is denoted by $S_{QdClients}$. Incoming clients are expected to select the content they wish to view prior to being queued for dispatch by the CAC sub-system, which requires knowledge of the client's bandwidth requirements, duration of play, and cost of service, all of which may vary according to the selection |
| server 220 | Servers sit astride a network and can deliver media content through the network to their clients up to a designated maximum flow rate. The server is responsible for accepting or rejecting clients, launching sessions and associated channels for the former, and modulates content flows over all channels in an optimal manner. |
| channel 210 | A channel represents the data path between the server and the client. The channel buffer is typically located near or within the client's viewing station. The flow of content through the channel is set by the flow modulator sub-system. |
| contentSelection 230 | A server will typically act as a repository for media content, which it can deliver to clients upon demand. For purposes of the invention, media content is characterized by its payload and the play duration, which together imply the averagePlayRate = (payload * 8)/(playTime * 60). The averagePlayRate is the streaming rate imposed by realtime just-in-time streaming algorithms. |
| session 240 | Every session represents an instance of media content delivery to an associated client over a designated channel. The playTimeToGo indicates the time remaining before the content is fully played out to the client. The payloadToGo is the amount of content data as yet undelivered to the channel. A session terminates when this value reaches zero, at which time playTimeToGo may still be large, according to the capacity, the level of the channel buffer, and the media play rate. |

Below are presented some formulas and problem statements which are used in the methods which follow.

The flow of content between entities is subject to the following constraints at all times. Buffer levels are always expressed in Mbytes and data rates in Mbits/sec.

$$\Sigma_{i \epsilon SactiveClients}(\text{client.lookup}(i).\text{channel.flowRate}) <= \text{server.maxFlowRate} \quad (1)$$

The sum of all channel flows cannot exceed the imposed maximum throughput capacity of the server.

$$\text{client.lookup}(i).\text{channel.flowRate} <= \text{client.lookup}(i).\text{channel.maxFlowRate for all } i \epsilon S_{activeClients} \quad (2)$$

The data path from server to client is subject to its own constriction.

$$\text{client.lookup}(i).\text{channel.flowRate} <= (\text{client.lookup}(i).\text{channel.bufferSize} - \text{client.lookup}(i).\text{channel.bufferLevel})*8/60 + \text{client.lookup}(i).\text{session.mediaContent.averagePlayRate, for all } i \epsilon S_{activeClients}, \quad (3)$$

The channel buffer is never allowed to overflow.

$$\text{client.lookup}(i).\text{channel.flowRate} <= \text{client.lookup}(i).\text{session.payloadToGo}*8/60 \text{ for all } i \epsilon S_{activeClients}, \quad (4)$$

Content that does not exist can not be delivered. (Constraint 1 will ordinarily prevail except at the very end of a session.)

The constraints listed above are straightforward applications relating to the flow of data through constricted channels, out of finite data sources, and into and out of bounded buffers. By contrast, the following constraint, which imposes a minimum channel flow rate instead of a maximum, is less obvious. The minimum value, termed the minFlowRate is set to the flow rate which, if sustained over the balance of the play time to go (playTimeToGo), ensures that all required content will be available when needed—and no sooner—until all content is played out. This floor value can be calculated for $i \epsilon S_{activeClients}$ by the formula $$\text{client.lookup}(i).\text{session minFlowRate} = (\text{client.lookup}(i).\text{session.payloadToGo}*8)/(\text{client.lookup}(i).\text{session.playTimeToGo}*60) \quad (5)$$

Thus:

$$\text{client.lookup}(i).\text{channel.flowRate} >= \text{client.lookup}(i).\text{session.minFlowRate for all } i \epsilon S_{activeClients} \quad (6)$$

The variable constraint bounds (i.e. the values to the right of the inequality symbol) of equations 1-4 and 6 are re-evaluated on a periodic basis (e.g. once per second) prior to the execution of the CAC procedure and optimizer. In particular, the minFlowRate value starts out at the beginning of a session equal to the streaming rate. By construction the min-FlowRate rate never exceeds this initial value so long as constraint 6 is honored. In fact, constraint 5 implies that the minFlowRate value must be a diminishing function of time that may hold its value for a time but never rises. As seen from equation 6, the actual data rate of the channel, flowRate, is always greater than or equal to the minFlowRate. By design, and virtue of the fact the present invention uses faster-than-realtime transmissions, the system quickly gets ahead of itself and ensures that after initial conditions, the minFlowRate is always equal to or less than the real-time rate and that it continues to decrease. As we shall see the CAC procedure exploits this monotonic characteristic of the minimum flow rate over time.

Constraints 2, 3 and 4 are of like kind, each specifying an upper bound on individual channel flows. Whereas the bound for constraint 2 is typically a constant, the bounds on 3 and 4 will vary over time. Nevertheless, only one of the three bounds is effective at any given time, namely the one with the smallest bound value, given by:

client.lookup($i$).session.maxFlowRate=minimum of 1)
    client.lookup($i$).channel.maxFlowRate, 2) (client.lookup($i$).channel.bufferSize−client.
    lookup($i$).channel.bufferLevel)*8/60+client-
    .lookup($i$).session.mediaContent.average-
    playRate, 3) client.lookup($i$).session.payloadToGo*8/60     (7)

Consequently, formulas 2, 3, and 4 can be consolidated into a single constraint, the bound for which is computed at every scan to be the smallest bound of associated constraints 2, 3 and 4.

client.lookup($i$).channel.flowRate<=client.lookup($i$)
    .session.maxFlowRate, whereby for all
    $i \in S_{activeClients}$, maxflowRate is given by equation
    (7).     (8)

At any one time, individual channel flows are constrained over a range, as follows:

client.lookup($i$).session.flowRateRange=client.
    lookup($i$).session.maxFlowRate−client.
    lookup($i$).session.minimumFlowRate     (9)

Value Functions

The value functions introduced in the Description of Related Art can now be expressed mathematically as linear functions of channel flows as follows:

Optimizing Throughput (Maximal Flow)

value=$\Sigma_{i \in SactiveClients}$client.lookup($i$).channel.flow-
    Rate)     (10)

Optimizing Charges (Maximal Charges)

value=$\Sigma_{i \in SactiveClients}$(client.lookup($i$).channel.flow-
    Rate)*client.lookup($i$).costOfService)     (11)

Optimization Problem

The optimization problem, which in one embodiment is strictly throughput and in another case is charge, can be stated simply as follows:

Find values for client.lookup($i$).channel.flowRate for all $i \in S_{activeClients}$ constrained by inequalities 1 through 5, such that the value obtained by evaluating expression 10 or 11 assumes a maximum.

Both of these problem formulations are examples of Linear Programming for which a number of well-known and generally effective computational solutions exist. In linear programming one seeks to optimize a linear cost function of variable x $$c*x = c_1*x_1 + \ldots + c_n*x_n \quad (12)$$

subject to a set of linear inequality constraints $$A*x <= b \quad (13)$$

where $x^T=(x_1, x_n)$, $c=(c_1, \ldots, c_n)$ are the state variable & cost vectors, A is an n-by-m matrix, $b^T=(b_1, \ldots b_m)$ is the constraint vector, and the operator '*' stands for matrix or scalar multiplication.

FIG. 3 is introduced as illustrative of the problem statement and the general methods of the prior art, and is not incorporated as an element of the invention.

The linear programming problem as well as its solution can best be understood with the aid of geometry. FIG. 3, depicting a 2-dimensional Cartesian problem space, inequality constraints (13) define a convex hull H 310 over which a search for an optimum value of $x=(x_1,x_2)$ is permitted to range. The cost vector c350 defines an infinite family of equal cost lines (hyperplanes) which lie orthogonal to c. Three examples of such lines are shown in $L_1$ 360, $L_2$ 365, and $L_3$ 370, each of progressively higher value. The supreme value of the cost function is obtained by sliding along c 350 till one can go no farther, in this instance toward vertex $V_4$340 of hull H 310. Many well-known methods (e.g. the Simplex Method) work roughly in this fashion, exploiting the fact that at least one optimum point must be at a vertex. In particular, the Simplex method algorithm begins by finding a vertex (e.g. $V_2$320), and then moves along a sequence of vertices (e.g. $V_3$330, $V_4$340) improving itself each time until no further improvement is possible & the summit is reached.

Let us suppose instead that $V_3$330 were placed along $L_3$370 along with $V_4$340. According to prior art methods, $V_3$330 and $V_4$340 are the two possible solutions, but the equally valuable points in between them are not. As we shall soon see, the problem of throughput optimization (6) falls in this category.

While vertex $V_1$300 does not factor into this description, it is depicted in FIG. 3 for completeness.

Flow Modulation

A Method for Maximal Flow

The following relates to one embodiment for optimizing the total data flow.

FIG. 4 depicts a scenario involving two flows. The convex hull is in this instance bounded by line segments L1, L2, L3, L4 and L5. L6 is a boundary used in a different embodiment, however the present embodiment uses L5 and not L6. Flow $f_2$ can range over the interval separating line segments L1 from L3, namely $f_2^{MIN}$ and $f_2^{MAX}$; the range is depicted as $f_2^{RANGE}$. Flow $f_1$ can range over the interval between lines L2 and L4, namely $f_1^{MIN}$ and $f_1^{MAX}$, and depicted as $f_1^{RANGE}$. Flow $f_1$ can range over the interval between lines L2 and L4, namely $f_1^{MIN}$ and $f_1^{MAX}$, as depicted as $f_1^{RANGE}$. The sum of flows $f_1$ and $f_2$ is constrained to lie inside of line segment L5 which, by construction, is always orthogonal to the cost vector $C_f$. Cost vector $C_e$ is also illustrated but used in a distinct embodiment. In the present embodiment, only $C_f$ is used. In the illustrated example of the present embodiment the constraint on total flow is set to 5, and is therefore low enough to cause L5 to intersect L3 and L4. This would not have been true had the value chosen had been 10 instead of 5. With L5 safely out of contention, the convex hull would instead be a simple rectangle bounded by L1 through L4, thereby permitting both flows to assume their respective maxima without interference. In practice operational constraints exist intrinsically or are imposed from the outside so as to ensure cost effective sharing of potentially costly network resources.

Supposing FIG. 4 to be correct, the well-known methods would select would vertex $V_{3-5}$, which lies at the intersection of L3 and L5, or $V_{4-5}$, which lies at the intersection of L4 and L5. These solutions, though optimal, are undesirable for the present invention as they fail to spread available bandwidth over all channels as fairly as would a centrally located interior point of L5. For this reason a simple optimization method is taught, which is adapted to the particular needs of this problem and ensures a fairer allocation of constrained bandwidth among all channels.

In order to optimize use of all available bandwidth, the following general method is used, with the details illustrated in FIG. 5. This method is a solution for the problem illustrated in FIG. 4, which geometrically illustrates the optimization problem in the limited case of two flows, f1 and f2. The following description expands the problem to an arbitrary number of clients (and therefore flows) and presents a method for solving this optimization problem.

Referring to FIG. 5, in step 500 values are calculated for the session maxFlowRate and session.minFlowRate for each client as per the minimum and maximum constraint bound expressions in 6 and 8, respectively.

The difference between these two yields the session.flowRateRange of each client. Thus session.flowRateRange=session maxFlowRate-session.minimumFlowRate In step 505, the active clients are sorted in an ascending fashion based upon their session.flowRateRange. As will be shown this critical step facilitates allocation of the remaining server bandwidth as evenly as possible among all active channels, thus maximizing the number of channels that benefit by use of the total server bandwidth. An arbitrary assignation of remaining bandwidth is likely to saturate the server before all channels have been assigned extra bandwidth, thereby favoring certain channels on an ad-hoc basis.

In step 510, each client's channel flow rate is set to the session mimimumFlowRate.

By doing so it is ensured that the minimum flow constraint is met for each session and that the minimum flow rate is a non-increasing function of time, which is critical to the proper functioning of the CAC procedure. All clients are marked as unprocessed.

In the next step, 520, server.flowRate is set to the sum of each active client's session.flowRate.

Next, the following is iterated over all clients in sorted sequence (during any given iteration the selected client is given by its id) by performing steps 530 through 570. In step 530 evaluating the following expressions test for possible server saturation:

delta=(server.maxFlowRate−server.flowRate)/(qty of
un-processed clients)range=client.lookup(*id*).
session.maxFlowRate-client.lookup(*id*).session.
flowRate If range is greater then delta, this implies that the server can be saturated in this iteration by allocating delta to all unprocessed clients (step 540).

On the other hand, the 'no' path for step 530 implies that the server is not saturated and that the present client (given by id) will saturate first. Accordingly, in 550 the delta variable is set as follows:

delta=range

Next, the flow rate is incremented for all unprocessed clients by delta, causing client id to saturate.

In step 560 the server flow rate is adjusted accordingly:

server.flowRate=server.flowRate+delta*(qty of
unprocessed clients)

In step 570 the client given by id, now saturated, is marked as processed.

A Method for Maximal Charge

The following relates to one embodiment for optimizing the total monetary charges within the system.

Referring back to FIG. 4, cost vector $C_c$ lies orthogonal to line L6, which intersects the convex hull at the vertex formed by the intersection of lines L4 and L5, namely $V_{4-5}$. This cost vector, and the optimal point that it implies, favors flow f1 over flow f2. In this example, this is as it should be, as the cost of service for f1 equals 2, thus exceeding the cost of service of 1 set for f2. As the number of flows grows to exceed the number of distinct categories of service (and associated costs of service) the unique optimal solution, depicted in FIG. 4 for the case where every flow has a distinct cost of service, no longer applies. Once again a plurality of flows within a service category vie for bandwidth which a method should endeavor to distribute evenly. This method is derived from the previous one, and optimizes one cost category after another, starting with the most costly and ending with the least costly, or when all available capacity is allocated.

Let the service categories be denoted by k=1 . . . N, where k also denotes the cost of service.

Let $C_1 \ldots C_N$ be the partition of $S_{activeClients}$ that places all clients with cost of service k in set $C_k$. Partition sets $C_k$ can be ordered to form sequence SeqC=$C_N \ldots C_1$.

FIG. 6 depicts the method for implementing the method to maximize the cost of service (service charge) according to objective function 2 described above.

This method is nearly identical to the previous one. The principle difference stems from the partitioning of clients according to their category (cost) of service: clients charged most are allocated bandwidth preferentially. This is accomplished by adding another level of iteration around the method of FIG. 5. The inner iteration (steps 650 through 680) functions exactly as before, with the difference that its actions are limited to the clients belonging to the given service category k (i.e. $C_k$). This difference also holds true of step 640 which sorts category k clients according to their flow ranges prior to entry in the bandwidth-allocating inner Loop. The outer loop proceeds down a sorted sequence of service categories SeqC (generated in step 630), starting with the category generating the greatest revenue to the service provider. Given a fairly static set of service categories, this sort need be performed only when the categories undergo change. Steps 670, 675 and 680 are identical to their counterparts in the method of FIG. 5 (i.e. 570, 575 and 580).

The net effect of this method is preferential allocation of bandwidth according to category of service, and equitable treatment of clients within the same category of service.

Call Acceptance Control (CAC)

CAC for Maximal Flow

The CAC procedure applicable to this flow optimization relies on the step of accepting a new client if and only if the added load induced thereby does not compromise service to existing clients or the new one. This step could not be accomplished without the close integration with previously-described flow-modulation methods of FIGS. 5 and 6.

According to the previous discussion, the minimum flow rate is the minimum sustained flow rate that guarantees that the associated viewer will not be subject to interruptions in service due to a shortfall of content from the media server. It follows that whenever data is being delivered at a rate in excess of the minimum flow rate, a downward adjustment toward the minimum level could be accommodated as needed to surrender bandwidth to any newcomer.

FIG. 7 depicts content flow over a channel over the course of a typical session, and also how data is delivered under real-time streaming (D). The amount of content delivered is the same in either case, but the manner of delivery differs considerably. A session is launched at time 0 as the network is lightly loaded, and the optimizer sets an accordingly high flow rate. Another client emerges at the end of interval 700, causing a downward adjustment to the flow rate over interval B, as available bandwidth is shared between two sessions. During both of these intervals the minimum flow rate 720 drops quickly, as data accumulates in the client's media buffers. At the end of interval B a massive influx of clients necessitates that flow be dropped to the minimum flow rate, which now lies substantially below the streaming rate D and is held until all data is delivered at the end of interval C. Note that the minimum flow rate, graphed as element 720, diminishes monotonically over time.

The server swing capacity is defined as the difference between the maximum capacity of the server and the total minimum flow rates for all active clients. Therefore:

$$\text{swingCapacity} = \text{server.maxFlowRate} - \Sigma_{i \in SactiveClients}(\text{client.lookup}(i).\text{session.minFlowRate}) \quad (14)$$

Given the monotonic decreasing nature of session minimum flow rates, server swing capacity can readily be seen to be a monotonic increasing function of time over the intervals separating client admissions, at which points it undergoes a drop as a new load is taken on. This all-important characteristic implies the following:

Any client admitted for service based on the present value of swing capacity is guaranteed to have sufficient bandwidth at its disposal over the entire future course of the session.

FIG. 8 depicts the server swing capacity 800 over the course of the sessions illustrated in FIG. 7. Swing capacity rises quickly over intervals A & B as data is delivered at high flow rates over the network. It holds steady over interval C when all channels flow at their minimum rate then jumps at the end of C before resuming its monotonic rise once again.

In this procedure FIG. 9, which executes on a periodic basis, queued clients awaiting bandwidth are scanned in FIFO order. For each one the required bandwidth is computed as per the client's prior content selection. If the available swing capacity reduced by a safety margin exceeds the amount required then the client is activated, and swing capacity is adjusted accordingly. Otherwise two possible cases are considered: 1) under the FirstFit embodiment the procedure continues scanning clients to the end of the queue, activating clients whose requirements can be met; 2) under the FIFO embodiment, the procedure ends with the first candidate client whose requirements cannot be met.

In step 900 available server swing capacity is evaluated according to the formula $$\text{swingCapacity} = \text{server.maxFlowRate} - \Sigma_{i \in SactiveClients}(\text{client.get}(i).\text{session.minimumFlowRate})$$

The bandwidth requirement for client id in Step 920 is obtained as follows:

$$\text{required\_bandwidth} = \text{client.lookup}(id).\text{contentSelection.averagePlayRate}$$

The predicate evaluated in Step 940 is given by the expression $$(\text{required\_bandwidth} <= \text{swingCapacity} - \text{server.cac\_flowSafetyMargin})$$

In step 950, client activation entails allocation of a session and a channel, and insertion in the set of active clients eligible for bandwidth allocation by the optimal flow modulator.

In step 960 the swing capacity is diminished by the amount reserved for the activated client:

$$\text{swingCapacity} = \text{swingCapacity} - \text{required\_bandwidth};$$

Responding to Variations In Network Capacity (Maximal Flow)

In the CAC procedure for maximal flow, a safety margin was introduced, namely server.cac_flowSafetyMargin, to provide the means for ensuring that the server's swing capacity will never fall below a minimal threshold value.

According to this procedure, the following inequality always holds true:

$$\text{swingCapacity} >= \text{server.cac\_flowSafetyMargin} \quad (15)$$

In the previous discussion a server's swing capacity provided the basis for determining whether or not a prospective client should be allocated bandwidth. In another embodiment, server swing capacity can also be interpreted as specifying the maximum amount by which the server.maxFlowRate can be dropped without affecting service, should such an adjustment prove necessary due, for instance, to an influx of exogenous network traffic that diminishes the amount available for multi-media services. Parameter server.cac_flowSafetyMargin can thus be set so as to guarantee a minimum capacity to tighten the constraint on maximum server flow in response to unexpected load changes that affect the server's ability to service its existing clients as well as new ones.

Anticipating Scheduled Variations in Network Capacity (Maximal Flow)

FIG. 10 depicts how the constraint on maximum flow might be allowed to vary according to the time of day, day of the week, and so forth, in expectation of time-varying traffic flow levels extrapolated from past experience, traffic flow models, etc. Maximum flow rate 1000 can be seen to vary based upon the time of day. In practice, defining the right-hand-side of inequality constraint 1 as a time-dependent expression can impose such time-varying capacities. According to the previous description, the optimizer, which executes on a periodic basis, will automatically seek new flow levels for every active session as the constraint varies. There is, however, no guarantee that an acceptable operating point will be found for all sessions (i.e. one that respects the minimal and maximum constraints on session channel flow). One such example is the case where the server is loaded to the limit and total capacity is curtailed in excess of the aforementioned safety margin. Should such a situation arise the only recourse may well be the termination of a number of established sessions (i.e. load shedding).

The goal is to eliminate service disruptions of this sort by allowing the CAC procedure to look ahead into the future, and accept new clients only if these can be accommodated without any compromise in service in the midst of previously anticipated changes in available network capacity. The following CAC procedure generalizes the previous one: before accepting a client the test on swing capacity is repeated over a sequence of time segments that cover the proposed viewing period.

Definitions

Let $$t\_end(i)=client.lookup(i).session.playTimeToGo+ t\_now \quad (16)$$

Let server.maxFlowRate(t) be server flow capacity as a function of time, as exemplified in FIG. 10.

Let $Seq_T(t\_now)$=advancing sequence of future times, lead by t_now, when server.maxFlowRate(t) undergoes a step change. For instance, at 9:15 in FIG. 10 this sequence reads as follows: 9:15, 9:30, 11:30, 13:30, 6:30, 7:30.

The server swing capacity at a future time t is computed according to the capacity and worst-case client flows at time t.

$$swingCapacity(t)=server.maxFlowRate(t)-\Sigma_{t\_end(i)>t} \\ (client.lookup(i).session.minFlowRate) \quad (17)$$

It is noteworthy that the worst-case client flows at time t are expressed in terms of the present minimum flow rates, which cannot increase over time, but might hold steady. Finally, a predicate is defined that tests whether a prospective customer will cause swing capacity to be exceeded at some time t, as follows:

```
boolean client_fits(i,t){if(client.lookup(i).
    contentSelection.averagePlayRate<=swingCapacity(t)-
    server.cac_flowSafetyMargin)return true; else
    return false;}                                    (18)
```

This procedure (FIG. 11) is an adaptation of the first, which has been extended to consider swing capacity at times in the future when capacity undergoes scheduled changes. Before accepting a client, its minimal bandwidth requirement (which by construction of the flow modulator will never increase over time) is checked against projected swing capacity at points in time when total available capacity undergoes scheduled step changes, provided these times fall within the proposed content viewing period. A candidate is activated only if all tests succeed.

Step 1100 builds a sequence of time values (SeqT) at which step capacity changes are scheduled to occur. The first element of this sequence is t_now, representing the present.

Beyond step 1100 the queue of waiting clients is scanned in FIFO order, yielding a candidate designated by id at each iteration.

The bandwidth requirement for client id in Step 1120 is obtained as follows:

required_bandwidth=client.lookup(id).contentSelection.averagePlayRate

The worst-case end time for content flow to id is obtained according to the content selected, as follows:

$t\_end=t\_now+client.lookup(id).selected.playTime$

Steps 1130 through 1150 are executed within an iteration for each time point t in SeqT falling between t_now and t_end. This iteration is ended in step 1130 if t exceeds the time window of interest, or in step 1150 if the supply of scheduled capacity changes is exhausted.

For each time value step 1140 compares required bandwidth to projected swing capacity. Projected swing capacity at time t is:

$$swingCapacity(t)=server.maxFlowRate(t)-\Sigma_{t\_end(i)>t} \\ (client.get(i).session.minimumFlowRate)$$

Note that only active clients whose t_end times occur after t are considered in the sum of minimum flow rates.

The predicate expression used in step 1140 at time t is thus (required_bandwidth<=swingCapacity(t)−
server.*cac*_flowSafetyMargin)

Step 1160 performs the same actions as step 660 in the previous cac flowchart.

The first CAC process presented above is a special case of the prese[P]nt one, in which the set of step change times to server.maxFlowRate is empty (i.e. server.maxFlowRate is constant), and $Seq_T(t\_now)$=t_now.

In preparing $Seq_T(t\_now)$, one need only consider future times that will pass before the longest possible content is played out if started at t_now. In order to sidestep problems associated with rollover (at midnight, year 2000, etc.), time is best expressed as a monotonically increasing value (e.g. seconds since Jan. 1, 1990).

CAC for Maximal Charges

The method for flow modulation presented above maximizes charges to clients with active sessions. The CAC embodiments presented previously may not be sufficient, as they do not consider the cost of service as a basis for connection acceptance. As a result they may turn away higher paying customers while granting service to lower paying ones, thereby defeating the purpose for this particular embodiment. Therefore, another embodiment is defined which offers the following features:

1. Awaiting clients are serviced in order of their respective service categories, higher paying clients first.
2. Once accepted, a client is guaranteed to receive acceptable service irrespective of its service category.
3. Under heavy load conditions higher paying customers are more likely to be accepted than lower paying ones.
4. Lower paying customers will not be starved for service when higher paying ones enjoy a surplus.
5. Available bandwidth is not thrown away needlessly while clients are being denied service.

The first objective is easily met by dividing the client queue into as many bands as there are service categories, resulting in a banded queue. Bands are ordered within the queue according to their service categories, with the costliest category in front. As prospective clients arrive and make their selection they are placed in their respective queue band according to their service category (which may be set contractually, according to content selection, etc.).

The second objective is met by employing a procedure patterned after those presented previously & offering the same guarantee. The 3rd and 4th objectives may be met by dividing total available bandwidth in as many strata as there are service categories, as depicted in FIG. 12. Two service categories are shown, Premium and Basic, each entailing an associated cost of service. A prospective client is accepted only if there is sufficient swing capacity available within its service category. The swing capacity for a given category is given by the smaller of 1) the difference between its maximum floor flow rate—corresponding to the top of the stratum for the service category—and the sum of the minimum rates of all active sessions in its category or below, and 2) available swing capacity overall. The fifth objective is met by allowing the flow optimizer to function freely subject to its operational constraints. The imposed ceilings on call acceptance by category relate to minimum flow rates, which merely impose a floor on actual flow rates. For example, basic clients might well consume all available bandwidth (300) in the absence of any premium customers, yet could be throttled back toward their floor flow rates (which together cannot exceed 200 in this example) at any time should any premium customer suddenly demand service. In contrast, premium customers could consume the entire 300 bandwidth. As lower paying customers appear these would be admitted to the degree that their quota on minimum flow is not exceeded (i.e. 200) and the availability of swing capacity on the system.

The procedure according to FIG. 13 requires a number of ancillary definitions, which follow:

Let the service categories be denoted by k=1 . . . N, where k also denotes the cost of service.

Let server.maxMinFlowRate[k−1] be the top of the stratum for service category k. Note that server.maxMinFlowRate [N−1] server.maxFlowRate.

Let $S_K$ be the set of active client indices with a service category equal to or less than k. Note that S1 is contained in S2, S2 is contained in S3, and so forth, and that $S_N = S_{ActiveClients}$.

Let swingCapacity(k) denote available swing capacity for service category k. By construction, swingCapacity(k)=minimum of: (server.maxMinFlowRate(k−1)−$\Sigma_{is\ Sk}$(client.lookup(i).session,minFlowRate)), (server.maxFlowRate−$\Sigma_{is\ SactiveClients}$(client.lookup(i).session.minFlowRate))) (19)

Now, referring to FIG. 13:

This method is used for CAC when multiple rate tariffs are in effect, and there is a desire to maximize economic returns to the service provider while offering acceptable service to all.

All waiting clients are scanned in FIFO sequence. The actions taken in Steps 1320 and 1360 are identical to those described in connection with earlier CAC flowcharts.

Step 1340 evaluates a predicate expression that tests whether the required bandwidth can be accommodated without exceeding the lesser of 1) swing capacity available to the client's category of service, and 2) total available swing across all categories of service. The latter factor could be determinative if all available bandwidth were allocated to high paying customers, leaving lower paying ones such as the proposed client unable to draw from their unfilled quota.

Let us suppose that candidate client id belongs to rate category k.

We define the swing capacity available in rate category k as:

swingcapacity(k)=least of: (server.maxMinFlowRate [k−1]−$\Sigma_{is\ Sk}$(client.lookup(i).session.minimumFlowRate))

and (server.maxFlowRate−$\Sigma_{is\ SactveClients}$(client.lookup(i). session.minimumFlowRate))

The predicate expression invoked by step 1340 can now be written as follows:

(required_bandwidth<=swingCapacity(k)−server.cac_flowSafetyMargin)

This algorithm processes queued clients in band sequence, and within every band in FIFO if the predicate evaluates to true the client is activated. Otherwise two possible cases are considered:

1) under the FirstFit embodiment the procedure continues scanning clients to the end of the banded queue, activating clients whose requirements can be met; 2) under the FIFO embodiment, the procedure ends with the first candidate client whose requirements cannot be met. Many other variations on these two embodiments might also be considered.

Anticipating Scheduled Variations in Network Capacity (Maximal Charge)

The procedure applicable to optimization of delivery charges is obtained by blending elements of the CAC method depicted in FIG. 13 into the method depicted in FIG. 11, which applies without change. To understand how this might work it may be useful to visualize a version of FIG. 10 stratified along its length in the manner of FIG. 8. As the maximum flow level undergoes a step change so too do the widths of its constituent strata in equal proportion.

As previously mentioned, the method of CAC described above (FIG. 11) applies to this circumstance also, provided we alter the definition routines, (17) and (18), upon which that procedure relies, yielding (20) and (21), and adopt the banded queue organization outlined in the previous section.

The server swing capacity at a future time t is computed according to the capacity and worst-case client flows at time t.

swingCapacity(k,t)=minimum of( (server.maxFlowRate(t)*(server.maxMinFlowRate[k−1]/server.maxMinFlowRate[N−1])−$\Sigma_{is\ Sk\ \&\ (t\_end(I)>t)}$(client.lookup(i).session.minFlowRate)), (server.maxFlowRate−$\Sigma_{is\ Sactive\ Clients\&(t\_end(i)>t)}$(client.lookup(i).session.minFlowRate))) (20)

Finally, we define a predicate that tests whether a prospective customer will cause swing capacity to be exceeded at some time t, as follows:

boolean client_fits(i,t) {k=client.lookup(i).costOfService; if(client.lookup(i).contentSelection.averagePlayRate<=swingCapacity(k,t)−server.cac_flowSafetyMargin) return true else return false;} (21)

A method for call/connection acceptance and flow modulation for network delivery of video/audio programming is thus provided. Although several embodiments have been illustrated and described, it will be apparent to those skilled in the art that various changes and modifications may be made without departing from the spirit of the invention as set forth in the following claims.

What is claimed is:

1. A method for bandwidth allocation for delivery of multimedia data from at least one server to clients over a network, the method comprising:
   determining a maximum flow rate and a minimum flow rate for each client;
   determining a flow rate range for each client, the flow rate range being the difference between the maximum flow rate and the minimum flow rate;
   sorting the clients according to the flow rate range respectively associated with each client;
   initializing a current flow rate for each client as the minimum flow rate respectively associated with each client;
   summing the flow rate for each client into a total server flow rate;
   establishing remaining server bandwidth based on the total server flow rate; and
   allocating the remaining server bandwidth to one or more of the clients based upon the flow rate ranges of the sorted clients.

2. The method of claim 1, wherein allocating the remaining server bandwidth comprises:
   determining a portion of the remaining server bandwidth equal to the remaining server band width divided by the number of unprocessed clients, the unprocessed clients being clients having a current flow rate equal to the initialized flow rate; and allocating an amount of the remaining server bandwidth to a client, the amount equal to the lesser of the determined portion of the remaining server bandwidth and the flow rate range of that client, wherein the determining of the portion and the allocating of the amount are performed individually for each client in sequence according to the flow rate respectively associated with each client.

3. The method of claim 1, further comprising sorting the clients according to categories of service corresponding to payment rates.

4. The method of claim 3, wherein allocating the remaining server bandwidth comprises:

determining a portion of the remaining server bandwidth equal to the remaining server band width divided by the number of unprocessed clients, the unprocessed clients being clients having a current flow rate equal to the initialized flow rate; and allocating an amount of the remaining server bandwidth to a client, the amount equal to the lesser of the determined portion of the remaining server bandwidth and the flow rate range of that client, wherein the determining of the portion and the allocating of the amount are performed individually for each client in sequence according to the flow rate respectively associated with each client determining saturation by comparing the equally allocated remaining bandwidth and the range of client bandwidth and allocating the lesser of these two to each client flow rate.

5. The method of claim 1, wherein allocating the remaining server bandwidth is further based upon a comparison of saturation of server versus saturation of each client in order to maximize allocation of total bandwidth for a maximal flow rate to a maximum number of clients.

6. The method of claim 1, wherein allocating the remaining server bandwidth comprises allocating remaining server bandwidth to remaining clients such that lower paying clients receive bandwidth when higher paying clients are saturated.

7. The method of claim 1, wherein allocating the remaining server bandwidth comprises:

determining a portion of the remaining server bandwidth equal to the remaining server band width divided by the number of unprocessed clients, the unprocessed clients being clients having a current flow rate equal to the initialized flow rate; and allocating an amount of the remaining server bandwidth to a client, the amount equal to the lesser of the determined portion of the remaining server bandwidth and the flow rate range of that client, wherein the determining of the portion and the allocating of the amount are performed individually for each client in sequence according to the flow rate respectively associated with each client, and wherein allocating flow to clients is based upon a comparison of saturation of server versus saturation of each client that maximizes allocation of total bandwidth for maximal flow rate to a maximum number of clients.

8. The method of claim 1, wherein the minimum flow rate for each client is expressed as a non-increasing function of time.

9. The method of claim 8, wherein the minimum flow rate is obtained by dividing content not yet delivered by remaining play time.

10. A method for connection acceptance control for delivery of multimedia data from server to clients over a network, the method comprising:

determining a minimum flow rate for each client;

determining server swing capacity, the server swing capacity being the difference between total server bandwidth and a summation of the minimum flow rate of each client; and allocating server bandwidth to each client without achieving server bandwidth saturation, the server bandwidth saturation being determined by comparing an average data play rate of each client with remaining bandwidth available to the server.

11. The method of claim 10, wherein the remaining bandwidth available to the server is equal to the server swing capacity.

12. The method of claim 10, wherein the remaining bandwidth available to the server is equal to the server swing capacity minus a server flow safety margin.

13. The method of claim 12, wherein allocating the server bandwidth for each client without achieving server bandwidth saturation includes allocating server bandwidth to each client sequentially until a client has an average data play rate that exceeds the server swing capacity.

14. The method of claim 13, wherein allocating the server bandwidth for each client without achieving server bandwidth saturation further includes allocating server bandwidth to clients sequentially for each client that can be activated without achieving server bandwidth saturation.

15. The method of claim 14, further comprising storing a sequence of data representing scheduled bandwidth changes for the server.

16. The method of claim 10, wherein the clients are distinguished by their cost of service and bandwidth is apportioned to clients iteratively, the amount apportioned to each client in a cost category is the amount remaining from prior allocations to clients in higher cost categories.

\* \* \* \* \*